United States Patent [19]
Yanagida

[11] Patent Number: 5,930,724
[45] Date of Patent: Jul. 27, 1999

[54] ELECTRONIC APPARATUS WITH ALARM FUNCTION

[75] Inventor: Keiichirou Yanagida, Tokyo, Japan

[73] Assignee: NEC Corporation, Tokyo, Japan

[21] Appl. No.: 08/871,909

[22] Filed: Jun. 12, 1997

[30] Foreign Application Priority Data

Jun. 12, 1996 [JP] Japan ................................ 8-149637

[51] Int. Cl.⁶ .................................................. H04B 1/38
[52] U.S. Cl. ........................... 455/550; 455/421; 455/575
[58] Field of Search .................... 455/421, 422, 455/550, 575, 90, 67.7, 88, 229, 567, 568, 569

[56] References Cited

U.S. PATENT DOCUMENTS

| | | | |
|---|---|---|---|
| 4,421,953 | 12/1983 | Zielinski | 455/567 |
| 5,040,204 | 8/1991 | Sasaki et al. | 455/567 |
| 5,490,286 | 2/1996 | Kah, Jr. | 455/421 |
| 5,732,331 | 3/1998 | Harms | 455/90 |
| 5,752,203 | 5/1998 | Yamashita | 455/575 |

FOREIGN PATENT DOCUMENTS

| | | |
|---|---|---|
| 5-14230 | 1/1993 | Japan . |
| 5-74038 | 8/1993 | Japan . |
| 5-284214 | 10/1993 | Japan . |
| 7-162956 | 6/1995 | Japan . |
| 91/14332 | 9/1991 | WIPO . |

OTHER PUBLICATIONS

Japanese Office Action dated Jul. 28, 1998 with English Language transulation of Japanese Examiner's comments.

*Primary Examiner*—Thanh Cong Le
*Assistant Examiner*—Darnell R. Armstrong
*Attorney, Agent, or Firm*—Whitham, Curtis & Whitham

[57] ABSTRACT

A portable telephone of the present invention is provided with a portable telephone body and a flipper which is detachable from the body. The body is provided with a transmission and receiving section, a speaker section, and an transmission means for generating at least one of a warning signal for announcing that the flipper is disconnected from the portable telephone and a call signal when receiving a call-in. The flipper is provided with a microphone section and a receiving means for receiving warning signal and call-in signal. By structuring a portable telephone as described above, a user of this portable telephone can recognize a call-in and recognize theft or misplacing, as long as the user carries always the flipper. A stranger can not used this portable telephone using a wrong flipper because the portable telephone body operates only when a specified flipper is connected.

6 Claims, 5 Drawing Sheets

ELECTRONIC APPARATUS WITH ALARM FUNCTION

BACKGROUND OF THE INVENTION

1. Field of the Invention

This invention an electronic apparatus with alarm function for preventing it from being misplaced, lost, and stolen, and more particularly relates to a portable telephone.

2. Description of the Related Art

Recently, portable electronic telephones have become popular devices. A flipper in which a microphone is provided is connected rotatably to a portable telephone body in which a speaker and dialing input section are provided. When a user is carrying such a portable telephone, the flipper is folded on the portable telephone body side so as not to generate a call erroneously, and when the user makes a call or receives a call, the flipper is opened for talking.

Various measures have been proposed for preventing such portable telephone from being misplaced, lost, and stolen. For example, a method that a user cannot make a call without inputting a personal identification number, and a method that a user ask the telephone service company to disconnect the telephone line are known.

Alternatively, a method that a transmitter for transmitting radio wave is built-in a portable telephone and the radio wave from the transmitter is received with a receiver has been proposed. For example, Japanese Utility Patent Laid-Open No. Hei 5-74038 discloses the combination of key-shaped transmitter and a receiver having a function to generate alarm when the portable telephone is moved outside beyond the reach of the radio wave.

However, such methods are disadvantageous as described herein under. In the case of the method of inputting a personal identification number, though the method can prevent the stolen portable telephone from being used unless the personal identification number is known, it is troublesome work to input a personal identification number each time a call is made. In the case of the method of asking the telephone service company to disconnect the telephone line, the stolen portable telephone can be used until the user asks to the telephone service company and the telephone line is actually disconnected, and if the user retrieves the stolen or lost portable telephone, the user must take a contact with the telephone service company. Further, in the case of the method that a transmitter is built-in a portable telephone, the user is required to carry at least a transmitter in addition to the portable telephone.

SUMMARY OF THE INVENTION

It is the object of the present invention to provide an electronic apparatus and particularly a portable telephone which solves the above-mentioned problems and is capable of detecting misplacement, loss, and theft, and prevents a thief from using the portable telephone.

It is the other object of the present invention to provide a portable telephone which is capable of informing immediately the user that the portable telephone is stolen.

The electronic apparatus of the present invention is provided with an electronic apparatus body having a warning signal transmission section and a flipper having a warning signal receiving section and being detachable from the electronic apparatus body. The portable telephone of the present invention is provided with a portable telephone body and a flipper which is detachable from the portable telephone body. The portable telephone body is provided with a warning signal transmission section, transmission and receiving section, and speaker section and the flipper is provided with a microphone section.

In detail, the portable telephone body may be provided with a transmission means for transmitting at least any one of a warning signal for announcing that the flipper is disconnected from the portable telephone body, and a call signal when receiving a call-in. Further, the portable telephone body may be provided with a judgement means for judging whether the connected flipper is the flipper corresponding to this apparatus and a means for enabling conversation to the external when the judgement means judges the connected flipper to be not corresponding to this apparatus.

The flipper may be provided with a receiving means for receiving the warning signal and call signal. The receiving means may be provided with a means for outputting alarm when detection of the warning signal is discontinued and a means for outputting call sound which is different from the alarm when receiving the call signal.

Such structure can prevent a portable telephone of the present invention from being used by a stranger in case of theft, and the user can become immediately aware of the theft of the portable telephone.

BRIEF DESCRIPTION OF THE DRAWINGS

The above and other objects, features and advantages of the present invention will become apparent from the following detailed description when taken with the accompanying drawing in which.

DETAILED DESCRIPTION OF THE PREFERRED EMBODIMENT

Figure 1:
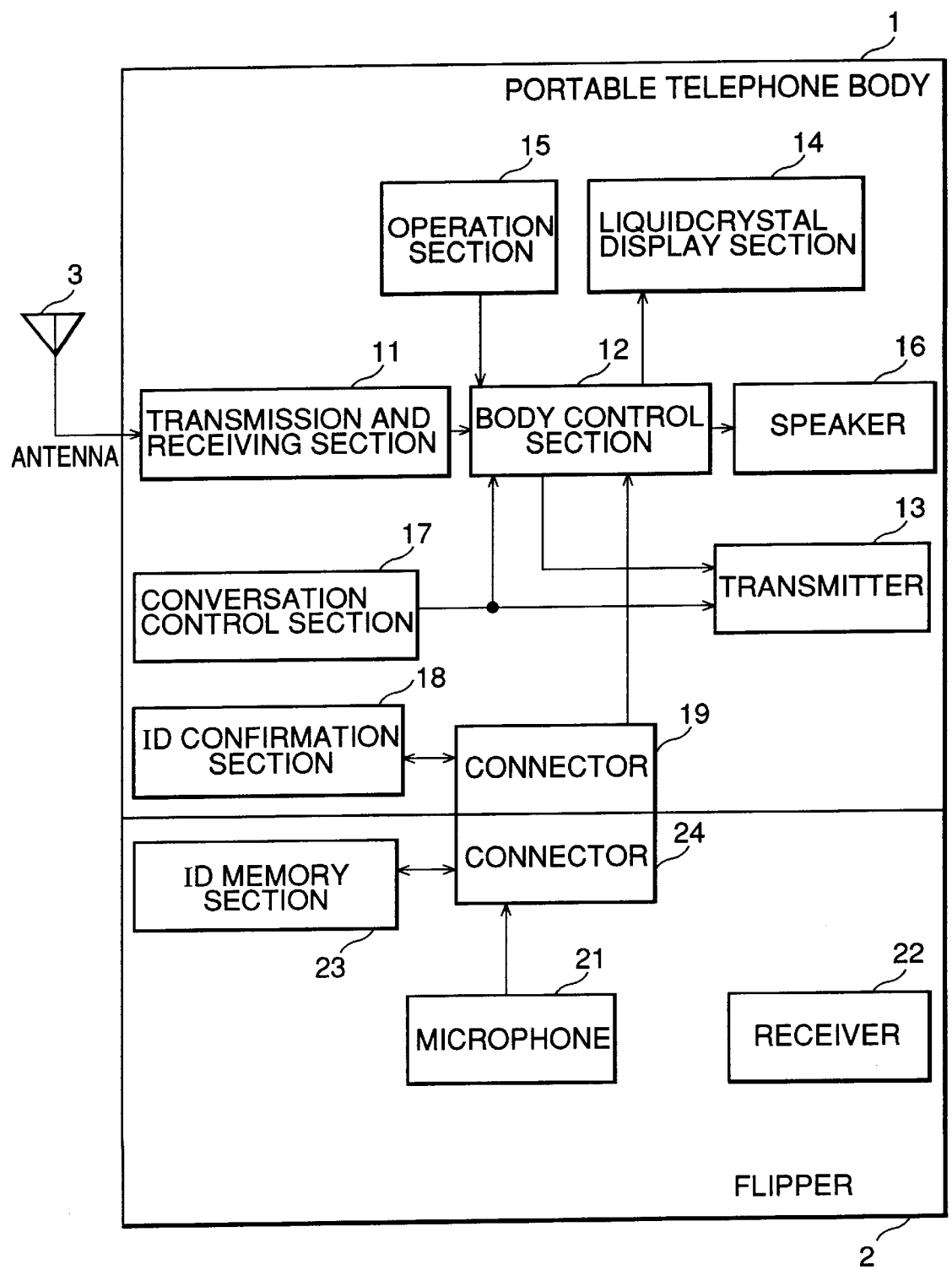
FIG. 1 is a functional block diagram for illustrating a structural example of a portable telephone of the present invention.

First, an embodiment of the present invention is described in detail hereinafter with reference to the drawings. FIG. 1 shows a portable telephone body 1 and flipper 2 connected together with connectors 19 and 24. The flipper 2 is detachable from the portable telephone body 1 through the connectors 19 and 24. The flipper 2 can be folded onto the body side while the flipper 2 is combined to the portable telephone body 1. An antenna 3 is connected to the portable telephone body 1. A signal received by means of the antenna 3 is supplied to a control section 12 through a transmission and receiving section 11. A control section 15 comprising a touch panel, a liquid crystal display section 14 for displaying a transmission and receiving signal, a speaker 16, a conversation control section 17, the connector 19, and a transmitter 13 is connected to the control section 12. An ID confirmation section 18 is provided between the connector 19 and conversation control section 17. The flipper is provided with a microphone 21, receiver 22, ID memory 23, and connector 24.

Figure 2:
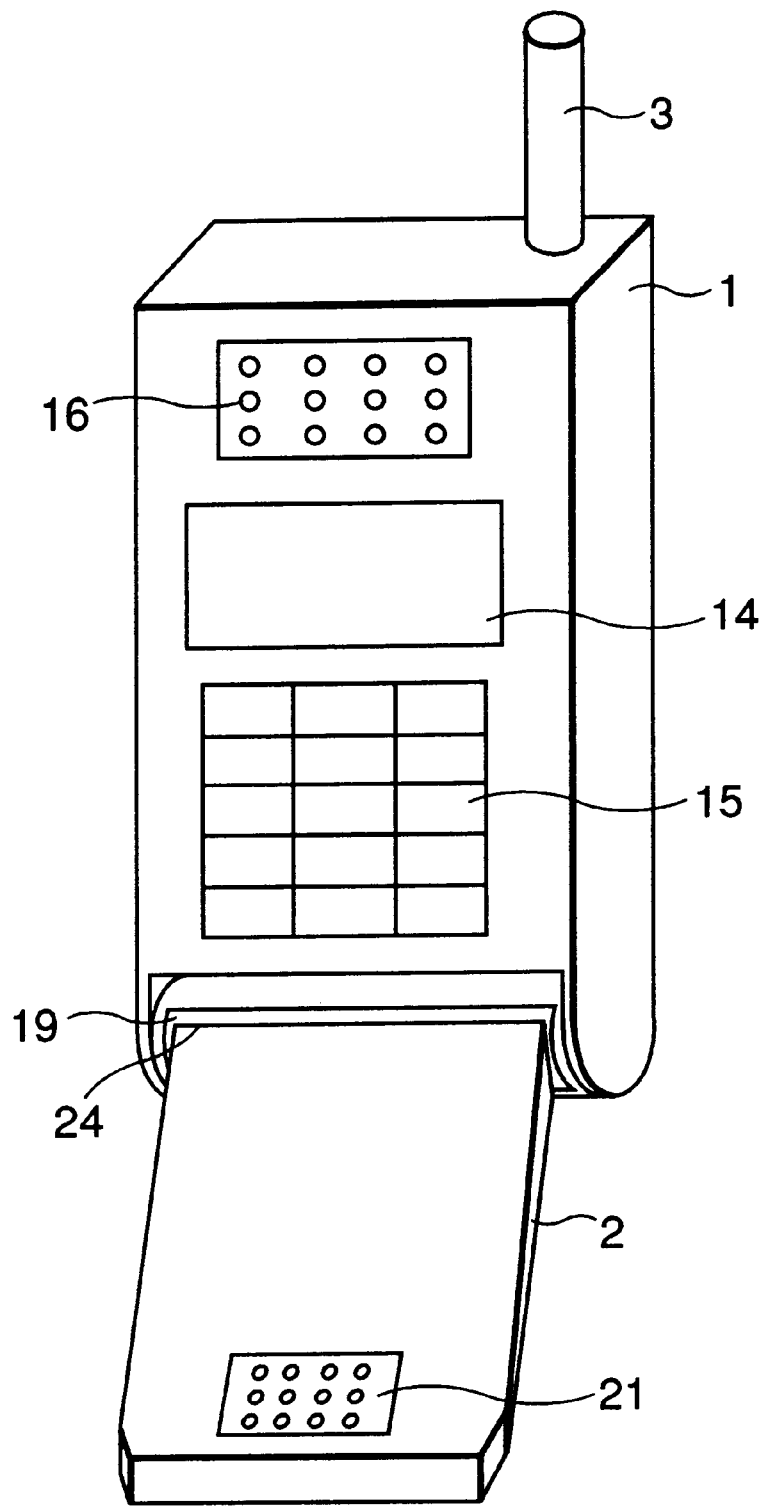
FIG. 2 is a perspective view of a combined portable telephone body and flipper of the present invention.
Figure 3A:
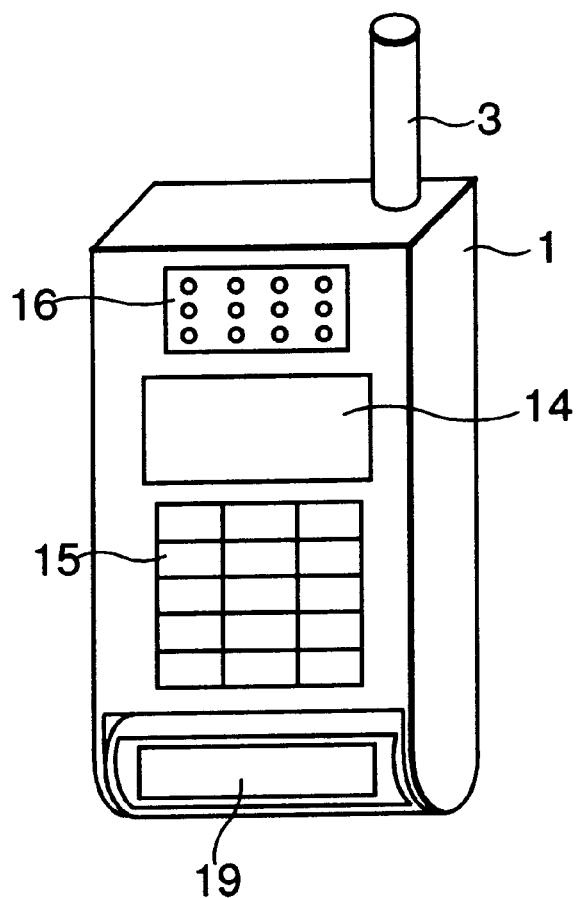
FIG. 3A and FIG. 3B are perspective views of the portable telephone body and flipper which are separated each other.
Figure 3B:
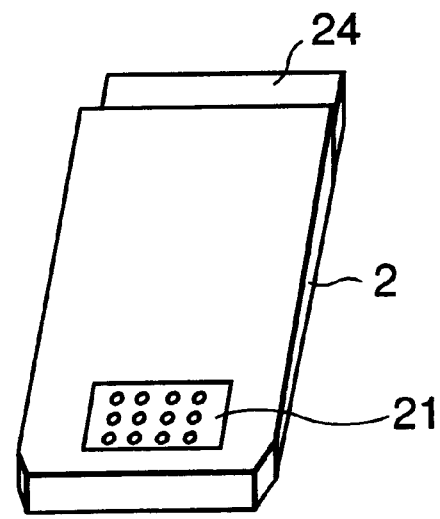

As shown in FIG. 2 and FIGS. 3A and 3B, a speaker 16, liquid crystal display section 14 and operation section 15 are provided on the principal surface of the portable telephone body 1. An antenna 3 is provided on the end of the portable telephone body 1. The flipper 2 with card configuration is connected so as to be folded and detachable with the connector 19. The microphone 21 is provided to the flipper 2.

In the case that the flipper 2 is connected to the portable telephone body 1 through the connectors 19 and 24, when a call-in signal is received through the antenna 3 and transmission and receiving section 11, the control section 12 outputs a signal to the speaker 16 for generating a call sound which announces the call-in. When a user operates the operation section 15 of the portable telephone body 1 to bring it in off-hook condition, speech signals received through the antenna 3 and transmission and receiving section 11 are outputted from the speaker 16 and speech signals inputted from the microphone 21 of the flipper 2 are transmitted through the receiving and transmission section 11 and antenna 3 under the control of the control section 12.

Power source of the portable telephone body 1 cannot be thrown in unless a flipper is connected to the portable telephone body 1. In the case that power source is thrown in to the portable telephone body 1 connected to the flipper 2 and thereafter the flipper 2 is disconnected from the portable telephone body 1, when the portable telephone body 1 receives a call-in signal, the control section 12 transmits a signal to the speaker for generating a call sound to announce the call-in and also transmits a signal to the transmitter 13 for generating UHF band weak radio wave as call signal. Upon receiving the calling signal from the transmitter 13, the receiver 22 of the flipper 2 operates to output a call sound from the speaker (not shown in the drawing) of the receiver 22. Accordingly, even if the portable telephone body 1 is placed in a bag, a call-in is perceived as long as the flipper 2 is held nearby.

The portable telephone body 1 is sending warning signal from the transmitter 13 to the flipper 2 by way of UHF band weak radio wave always as long as power source is supplied. If the flipper 2 is moved far beyond the receiving limit of the UHF band weak radio wave emitted from the transmitter 13, the speaker (not shown in the drawing) of the receiver 22 outputs alarm. Therefore, a user can become aware immediately of theft or misplacing of the portable telephone body 1 when the portable telephone is stolen and misplaced as long as the user keeps the flipper 2.

When power source of the portable telephone body 1 to which the flipper 2 is connected is turned on or when the flipper 2 is connected to the portable telephone body 1 the power source of which is turned on, the ID confirmation section 18 of the portable telephone body 1 reads ID previously stored in the ID memory 23 of the flipper 2 through the connectors 19 and 24, and compares the ID with a previously pre-determined ID. If the ID read from the ID memory 23 coincides with the pre-determined ID, the ID confirmation section 18 transmits data of "ready for conversation" to the control section 12 through the conversation control section 17. Upon receiving the data of "ready for conversation" from the conversation control section 17, the control section 12 enables conversation when calling in or calling out. If the ID read from the ID memory 23 does not coincide with the pre-determined ID, the ID confirmation section 18 transmits data of "NG for conversation" to the control section 12 of the body 1 through the conversation control section 17. In the case that the flipper 2 is not connected to the portable telephone body 1 the power source of which is turned on and therefore an ID cannot be read from the ID memory 23, the data "NG for conversation" can be transmitted to the control section 12 of the body 1 through the conversation control section 17. Upon receiving the data of "NG for conversation" from the conversation control section 17, the control section 12 enables it to be used only for calling in and locks or disables the dialing operation of the operation section 15 to disenable calling out. In the case that the ID of the flipper 2 connected to the portable telephone body 1 does not correspond to this apparatus, the control section 12 does not allow speech signal inputted from the microphone 21 of the flipper 2 to be transmitted through the transmission and receiving section 11 and antenna 3. Accordingly, conversation to the calling-in is impossible. Further, in the case that the flipper is disconnected from the portable telephone body 1, conversation is impossible to a calling-in because the microphone 21 is separated. By disconnecting the flipper 2, the portable telephone can be used for calling in and cannot be used for calling out without providing the conversation control section 17 and ID confirmation section 18 to the portable telephone body 1, and ID memory 23 to the flipper 2.

Figure 4:
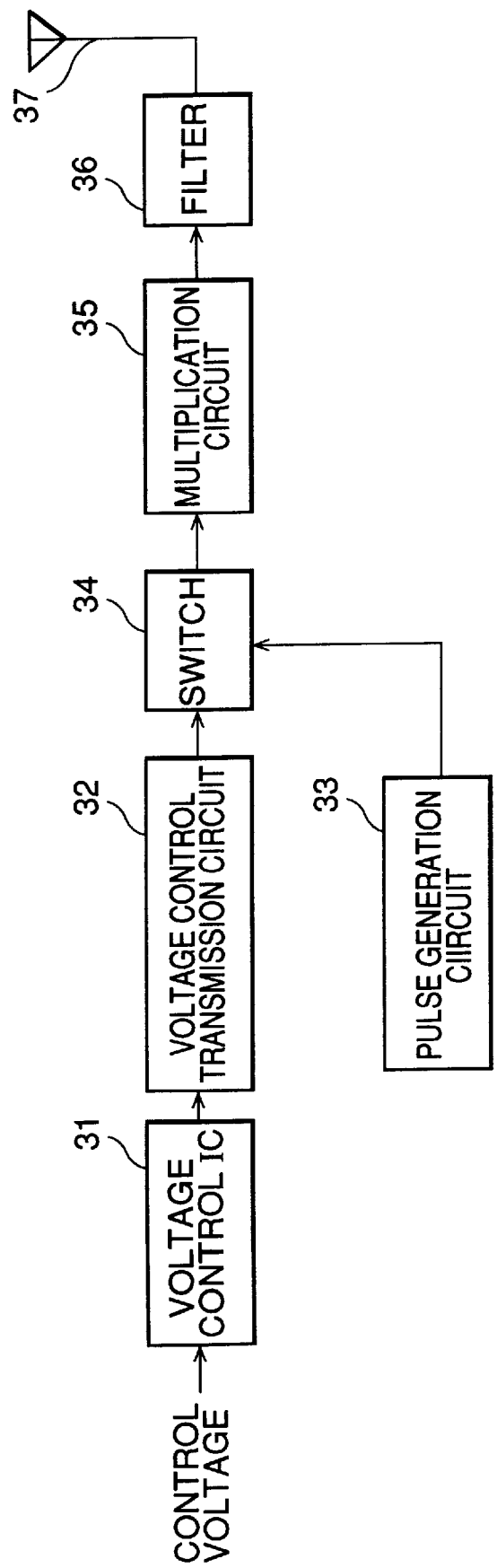
FIG. 4 is a block diagram for illustrating a structural example of a transmitter shown in FIG. 1.

In the transmitter 13 of the portable telephone body 1, a voltage control IC 31 is connected to a voltage control transmission circuit 32, and the voltage control transmission circuit 32 and a pulse generation circuit 33 are connected to a switch 34 as shown in FIG. 4. Further, a multiplication circuit 35, filter 36, and switch 34 are connected in series to the switch 34. When power source is thrown in the portable telephone body 1 to which the flipper 2 is connected, the portable telephone body 1 becomes ready for calling in from a base station (not shown in the drawing), that is, the portable telephone body 1 is brought into the waiting condition for calling in. The portable telephone body 1 searches a channel (free channel) which is used for transmission from the base station but not used now. If the portable telephone body 1 finds a free channel, the portable telephone body 1 is brought into waiting condition in the channel. The waiting frequency is referred to as waiting channel. In the waiting condition for a call-in, the voltage control IC 31 generates a voltage corresponding to the waiting channel, and the control voltage is continued fixed until power source of the portable telephone body 1 is turned off. The voltage control IC 31 outputs always control voltage corresponding to the waiting channel to the voltage control transmission circuit 32, and the voltage control transmission circuit 32 transmits a warning signal. Further, the control voltage generated from the voltage control IC 31 determines the frequency of UHF band weak radio wave emitted from the transmitter 13. In other words, during waiting condition, the warning signal is transmitted to the receiver 22 side of the flipper 2 as UHF weak radio wave through the switch 34, multiplication circuit 35, filter 36, and antenna 37.

On the other hand, if the portable telephone body 1 receives a call-in signal through the antenna 3 and transmission and receiving section 11 while the flipper 2 is disconnected from the portable telephone body 1, the control section 12 transmits the call-in signal to the transmitter 13. Upon input of the call-in signal to the transmitter 13, the pulse generation circuit 33 operates the switch 34 to switch. The pulse signal generated in the pulse generation circuit 33 is transmitted to the receiver side 22 through the switch 34, multiplication circuit 35, filter 36, and antenna 37 by way of UHF band weak radio wave.

Figure 5:
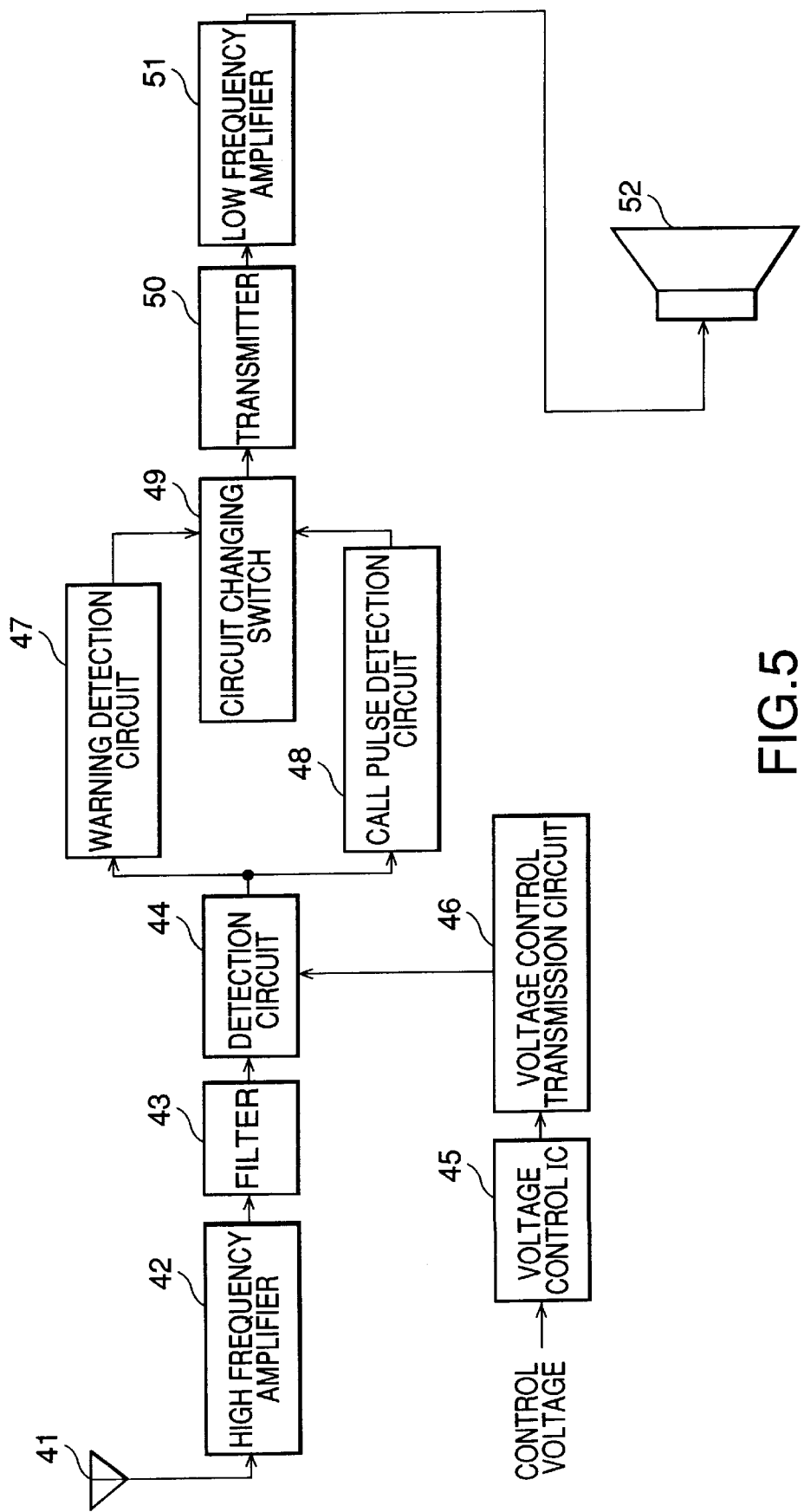
FIG. 5 is a block diagram for illustrating a structural example of a receiver shown in FIG. 1.

As shown in FIG. 5, the signal is transmitted to a detection circuit 44 through an antenna 41, high frequency amplifier 42, and filter 43. The detection circuit 44 is connected to a voltage control transmission circuit 46 and the voltage control transmission circuit 46 is connected to a voltage control IC 45 which performs the same control as the voltage control IC 31 of the transmitter 13 shown in FIG. 4. When power source is thrown in the portable telephone body 1, the flipper 2 is connected to the portable telephone body 1, and the portable telephone body 1 catches a free channel and is brought into waiting condition in the channel. Accordingly, the voltage control IC 31 generates the same control voltage corresponding to the waiting channel in the receiver 22 in response to the operation of the voltage control IC 31 of the transmitter 13. Therefore, the voltage control transmission circuit 46 transmits the signal with the same frequency as the voltage control transmission circuit 32 of the transmitter 13 shown in FIG. 4. The detection circuit 44 is connected to a warning detection circuit 47 and call pulse detection circuit 48. Further, the output signals from these two detection circuits are switched by means of a circuit changing switch 49, and the signal is outputted from the speaker 52 through a transmitter 50 and low frequency amplifier 51.

The warning detection circuit 47 detects whether a UHF band weak radio wave supplied from the detection circuit 44 is a warning signal or not. When the condition in which the warning detection circuit 47 is detecting UHF band weak radio wave of the warning signal changes subsequently to the condition in which the warning detection circuit 47 is not detecting UHF band weak radio wave, the warning detection circuit turns the switch 49 to output a warning signal. The warning signal is outputted from a speaker 52 as an alarm. The call pulse detection circuit 48 detects whether the UHF band weak radio wave supplied from the detection circuit 44 is a call pulse or not. Upon detecting a call pulse, the call pulse detection circuit 48 turns the switch 49 and outputs a call signal. The call signal is outputted from the speaker 52 as the calling sound which is different from the above-mentioned alarm.

As described herein above, even though a user is distant from the portable telephone body 1, the user can become aware of a call-in as long as the flipper 2 is near the user. The portable telephone body 1 transmits UHF band weak radio wave to the flipper 2 always as long as the power source is turned on, and if the portable telephone body 1 is carried outside beyond the detection limit of the UHF weak radio wave, the flipper 2 generates an alarm. Therefore, a user can recognize immediately theft or misplacing as long as the flipper 2 is near the user when the portable telephone body 1 is stolen or misplaced. The portable telephone body 1 is operated only when the flipper 2 is connected or a flipper corresponding to this apparatus is connected. Accordingly, strangers other than the user cannot use the portable telephone body 1 as long as the user keeps the flipper 2 even though the portable telephone body 1 is stolen or misplaced.

The detectable limit of UHF band weak radio wave can be prescribed in a range from 5 m to 10 m. The configuration of the flipper can be a size of, for example, 4 to 6 cm height, 7 to 10 cm width, and 0.5 cm thickness.

While the present invention has been described in connection with certain preferred embodiments, it is to be understood that the subjects matter encompassed by the present invention is not limited to those specific embodiments. On the contrary, it is intended to include all alternatives, modifications, and equivalents as can be included within the spirit and scope of the following claims.

What is claimed is:

1. A portable telephone comprising:

a portable telephone body having a warning signal transmission section, transmission and receiving section, and speaker section; and a flipper having a microphone section and being detachable from said portable telephone body, wherein said portable telephone body comprises a judgement means for judging whether a connected flipper is the flipper corresponding to said portable telephone body, and a means for disabling a conversation when said judgement means judges the flipper to be not corresponding to said portable telephone body.

2. A portable telephone comprising:

a portable telephone body having a warning signal transmission section, transmission and receiving section, and speaker section; and a flipper having a microphone section and being detachable from said portable telephone body, wherein at least one of a warning signal and a call-in signal is a signal having a frequency based on a line frequency which said portable telephone body uses.

3. A portable telephone comprising:

a portable telephone body having a warning signal transmission section, transmission and receiving section, and speaker section; and a flipper having a microphone section and being detachable from said portable telephone body, wherein said warning signal transmission section comprises a switch for switching between a warning signal and a call-in signal.

4. A portable telephone comprising:

a portable telephone body having a warning signal transmission section, transmission and receiving section, and speaker section; and a flipper having a microphone section and being detachable from said portable telephone body, wherein said warning signal transmission section transmits a warning signal and a call-in signal by UHF band radio wave.

5. A portable telephone comprising:

a portable telephone body having a warning signal transmission section, transmission and receiving section, and speaker section; and a flipper having a microphone section and being detachable from said portable telephone body, wherein said flipper is provided with a receiving means for receiving a warning signal and a call-in signal.

6. The portable telephone as claimed in claim 5, wherein said receiving means is provided with a means for outputting an alarm when detection of said warning signal is discontinued and a means for outputting a calling sound when said call-in signal is received.

* * * * *